(12) United States Patent
Bluestone

(10) Patent No.: US 6,481,676 B1
(45) Date of Patent: Nov. 19, 2002

(54) EXPANDABLE DUCT HANGER

(75) Inventor: Richard A. Bluestone, Mayfield Heights, OH (US)

(73) Assignee: Alan Manufacturing Inc., Cleveland, OH (US)

( * ) Notice: Subject to any disclaimer, the term of this patent is extended or adjusted under 35 U.S.C. 154(b) by 0 days.

(21) Appl. No.: 09/946,193

(22) Filed: Sep. 5, 2001

(51) Int. Cl.$^7$ ............................................... A47G 29/00
(52) U.S. Cl. ................................................... 248/217.2
(58) Field of Search ........................... 248/216.1, 216.4, 248/217.1, 217.2, 217.3, 71

(56) References Cited

U.S. PATENT DOCUMENTS

| | | | | |
|---|---|---|---|---|
| 2,917,263 A | * | 12/1959 | Appleton et al. | 248/217.3 |
| 3,163,386 A | | 12/1964 | Collins | |
| 6,296,211 B1 | * | 10/2001 | Snyder | 248/217.2 X |

* cited by examiner

Primary Examiner—Ramon O. Ramirez
(74) Attorney, Agent, or Firm—D. Peter Hochberg; Katherine R. Vieyra; Sean Mellino

(57) ABSTRACT

The present invention is an expandable duct hanger comprised of two pieces, one piece having a ridge which slides into a channel in the other piece, each piece also having a prong on one end to secure and hold the duct hanger into the floor joists.

11 Claims, 2 Drawing Sheets

EXPANDABLE DUCT HANGER

BACKGROUND OF THE INVENTION

1. Field of the Invention

This invention relates to duct hangers, and it more particularly relates to an easy to manufacture and install expandable duct hanger.

2. Description of the Prior Art

Most buildings, whether residential or commercial construction, contain ducts as part of their heating, ventilating and cooling systems. These ducts are generally suspended from the floor joists. Installation of these ducts becomes complex in situations where the distance between the joists is not uniform. In U.S. Pat. No. 3,163,386, an adjustable duct hanger is disclosed which is manually adjustable to fit the distance between a pair of adjacent floor joists. This duct hanger has prongs welded onto either end which are pounded into the floor joists. One problem with this prior art is that the welded prongs tend to break due to fracturing of the weld. Another problem is that the duct hanger is complicated to manufacture, particularly in an efficient and practical manner. A further problem is that adjusting this duct hanger to the desired size during installation is difficult because the high area of surface contact between the sliding parts results in friction which impairs the ease of movement between the sliding parts. The present invention solves these problems in a unique manner.

SUMMARY OF THE INVENTION

It is an object of the present invention to provide an easy to manufacture expandable duct hanger.

Another object of the present invention is to provide an expandable duct hanger which is sturdy and durable.

Another object of the present invention is to provide an expandable duct hanger such that the duct hanger is inexpensive to manufacture, and easy and economical to produce.

Still another object of the present invention is to provide an expandable duct hanger whose parts slide easily when connected, making adjustment of the duct hanger simple.

Still another object of the present invention is to provide an expandable duct hanger which is strong and will not break during installation.

Other objects will be apparent from the description to follow and from the appended claims.

The foregoing objects are achieved according to a preferred embodiment of the invention by means of a two piece expandable duct hanger having one piece with a ridge which slides into a channel in the other piece, each piece also having a prong on one end to secure and hold the duct hanger into the floor joists.

DESCRIPTION OF THE PREFERRED EMBODIMENTS

Figure 1:
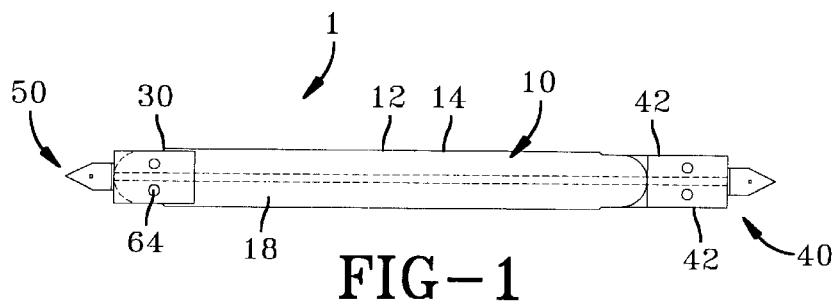
FIG. 1 is a perspective view of the duct hanger.
Figure 2:
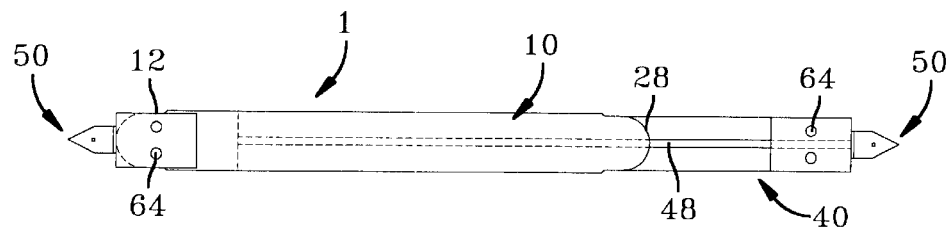
FIG. 2 is a top view of the duct hanger.
Figure 3:
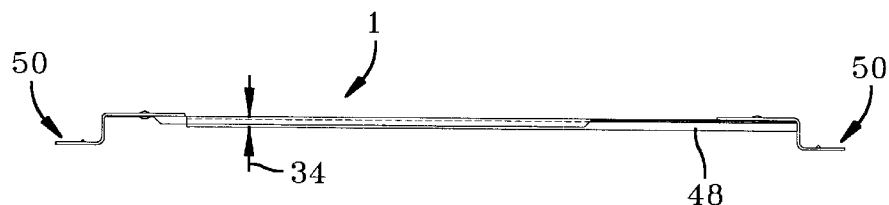
FIG. 3 is a side elevation view of the duct hanger.
Figure 4:
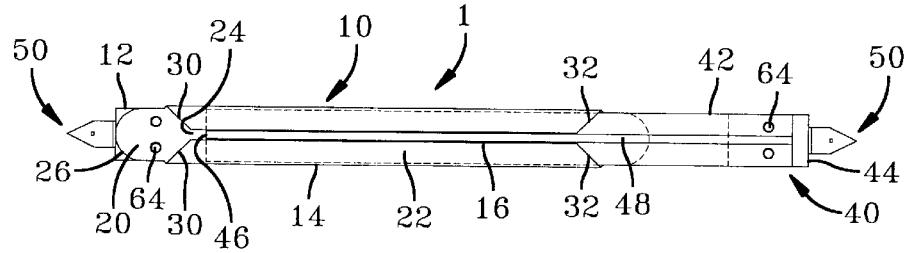
FIG. 4 is a bottom view of the duct hanger.
Figure 5:
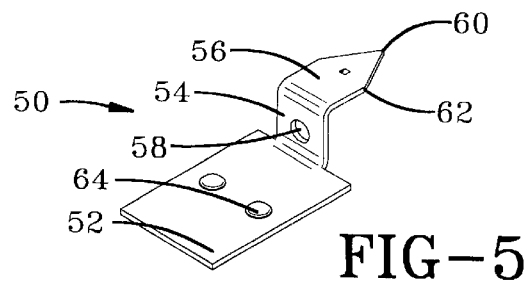
FIG. 5 is a perspective view of the prong.
Figure 1A:
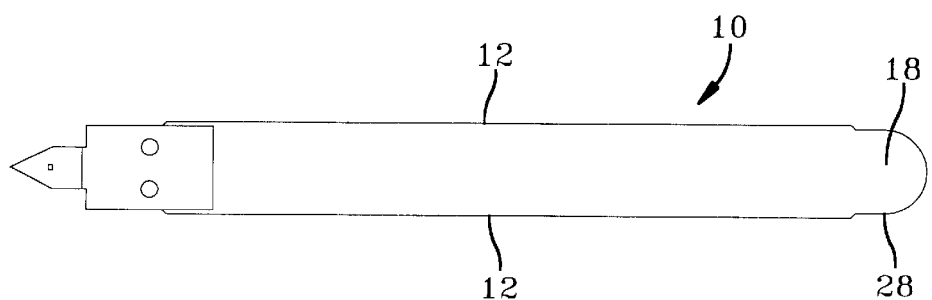
FIG. 1a is a top view of the base portion of the duct hanger.
Figure 1B:
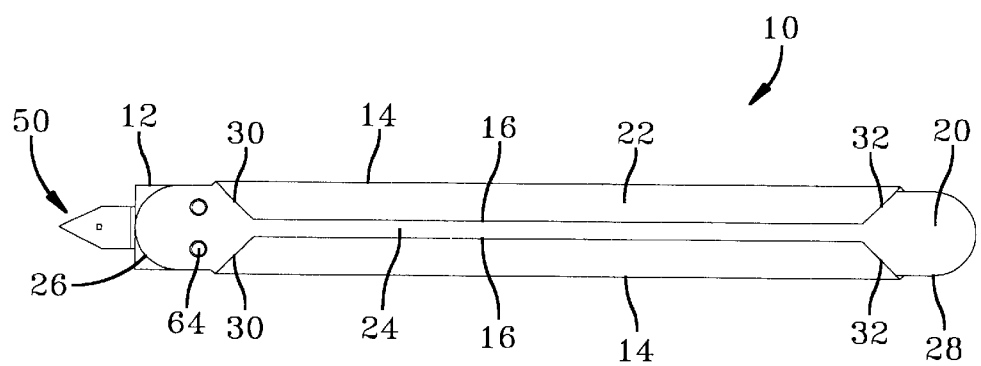
FIG. 1b is a bottom view of the base portion of the duct hanger.

The preferred embodiment of the invention described below comprises an expandable duct hanger as shown in the drawings comprising one piece with a center ridge which slides in a channel in the second piece, and, on the end which does not slide into the other piece, a prong which is into a floor joist.

Refer now to the drawings wherein the showings are for the purpose of illustrating the preferred embodiment of the invention only, and not for the purpose of limiting same. The expandable duct hanger 1 has a base piece 10 which is preferably made from an elongated metal strip whose longitudinal sides 12 are folded over to form parallel folds, each having a longitudinal edge 14 and a fold edge 16, extending along most of the length of base piece 10. Base piece 10 has a smooth front surface 18 and the back is composed of two surfaces, bottom 20 and fold 22, the bottom surface 20 extending between the longitudinal edges 14 and the fold surface 22 commencing at fold edge 16 and terminating in a longitudinal edge 14. Fold edges 16 are parallel to each other and form a longitudinal recess or channel 24. The bottom surface terminates in the longitudinal direction at transverse edges 26, 28 and the fold surface terminates in the longitudinal direction at transverse edges 30, 32. The distance 34 between the bottom surface 20 and the fold surface 22 is about ⅛ inch.

The expandable duct hanger 1 also has a top piece 40 which is preferably made from an elongated metal strip. A pair of longitudinal edges 42 of the top piece 40 are parallel to each other and terminate at a pair of opposing, parallel traverse edges 44, 46. Parallel to these longitudinal edges 42, in the center of the top piece 40, is an elongated longitudinal ridge 48 which forms an integral part of the top piece and extends vertically for the entire length of the top piece. The width of the channel 24 of the base piece 10 is greater than the width of the ridge 48 of the top piece 40, so that the expandable duct hanger 1 can be easily adjusted by sliding the top piece 40 while it is engaged with the base piece 10.

There are two prongs or securing apparatus 50 which secure the base piece 10 and the top piece 40 to a floor joist (not shown). Each prong 50 or securing apparatus is an S-shaped piece comprised of a base portion 52 of the S, a vertical portion 54 of the S, and a top, trapezoidal shaped portion 56 of the S. The vertical portion 54 has an opening 58 through which a nail or screw can pass to secure the prong 50 to a floor joist. The top portion 56 has a point 60 on its free end, making insertion into a floor joist easier, and at least one barb 62 or locking means for securing the prong 50 in the floor joist.

One prong 50 is connected with more than one rivet 64 to the base piece 10 near one of its short edges 26, and another prong 50 is connected with more than one rivet 64 to the top piece 40 near one of its short edges 44. The end 46 of the top piece 40 without the prong 50 is engaged with the end 28 of the base piece 10 without the prong 50 forming the expandable duct hanger 1.

In a preferred embodiment, the channel 24 is approximately ¼ inch wide and the ridge 48 is approximately 3/16 inch wide. In another preferred embodiment, two rivets 64 connect each prong 50 to each piece 10, 30. In yet another preferred embodiment, the ends 26, 28 of the base piece are semicircular.

The invention is particularly advantageous when made from formed metal goods. It can easily be made using conventional tools, and can support ducts in a reliable fashion.

The invention has been described in detail with particular emphasis being placed on the preferred embodiments thereof, but variations and modifications within the spirit and scope of the invention may occur to those skilled in the art to which the invention pertains.

I claim:

1. An expandable duct hanger comprising:

a base piece having longitudinal sides, a front surface, a back bottom surface, and a back fold surface, each of said longitudinal sides being folded to form a parallel fold having a longitudinal edge and a fold edge extending most of the length of said base piece and a fold distance between the back bottom surface and the back fold surface, said back bottom surface extending from the longitudinal edge of one parallel fold to the longitudinal edge of the other parallel fold and terminating in the longitudinal direction at transverse edges, said back fold surface commencing at said fold edge and terminating at said longitudinal edge, said fold edges being parallel to each other, forming a channel and terminating in fold transverse edges;

a top piece having a pair of parallel longitudinal edges terminating in a pair of opposing, parallel traverse edges and a longitudinal, vertically extending elongated ridge parallel to and in the center of said longitudinal edges, said ridge having a width, wherein said channel is greater than said width, enabling the top piece to slide easily while connected to the base piece;

at least two securing apparatuses for securing said base piece and said top piece to a floor joist;

at least one connecting member for connecting each of said securing apparatuses to said base piece near one transverse edge; and at least one connecting member for connecting another of said securing apparatuses to said top piece near one parallel transverse edge;

said base piece and said top piece being telescopically connected, said fold distance allowing the top piece to move within the base piece.

2. An expandable duct hanger according to claim 1, wherein:

said channel is ¼ inch and said width of said ridge is 3/16 inch.

3. An expandable duct hanger according to claim 1, wherein:

two rivets connect said securing apparatus to said base piece and two rivets connect said securing apparatus to said top piece.

4. An expandable duct hanger according to claim 1, wherein:

said transverse edge connected to said securing apparatus is semicircular.

5. An expandable duct hanger according to claim 1, wherein:

said parallel transverse edge connected to said securing apparatus is semicircular.

6. An expandable duct hanger according to claim 1, wherein:

said base piece and said top piece are detachably connected.

7. An expandable duct hanger according to claim 1, wherein:

said base piece and said top piece are made from metal.

8. An expandable duct hanger according to claim 1, wherein:

said base piece and said top piece are made from galvanized steel.

9. An expandable duct hanger according to claim 1, wherein:

said fold distance is at least ⅛ inch.

10. An expandable duct hanger according to claim 1, wherein:

said connecting members are rivets.

11. An expandable duct hanger according to claim 1, wherein:

said connecting members are at least four rivets, two rivets for each of said securing apparatuses.

* * * * *